United States Patent [19]

Inoue

[11] Patent Number: 5,963,725

[45] Date of Patent: Oct. 5, 1999

[54] SIMULATION SYSTEM AND METHOD FOR MICROCOMPUTER PROGRAM

[75] Inventor: Masaharu Inoue, Tokyo, Japan

[73] Assignee: NEC Corporation, Tokyo, Japan

[21] Appl. No.: 08/928,433

[22] Filed: Sep. 12, 1997

[30] Foreign Application Priority Data

Sep. 12, 1996 [JP] Japan .................................. 8-241945

[51] Int. Cl.⁶ .................................................. G06F 9/455
[52] U.S. Cl. ................................................................ 395/500
[58] Field of Search ............................. 395/500, 700, 395/705, 800, 183; 364/578, 200

[56] References Cited

U.S. PATENT DOCUMENTS

| | | | |
|---|---|---|---|
| 3,932,843 | 1/1976 | Trelut et al. | 340/172.5 |
| 5,805,470 | 9/1998 | Averill | 364/578 |

FOREIGN PATENT DOCUMENTS

| | | |
|---|---|---|
| 3-125233 | 5/1991 | Japan . |
| 6-208480 | 7/1994 | Japan . |

*Primary Examiner*—Kevin J. Teska
*Assistant Examiner*—Lonnie A. Knox
*Attorney, Agent, or Firm*—Foley & Lardner

[57] ABSTRACT

In a computer program simulation system, a simulation control unit calculates a simulation time until a machine language instruction execution simulation has an influence on a peripheral circuit simulation, and a simulation time notification unit provided in the simulation control unit notifies the calculated simulation time to a peripheral circuit simulation unit. The peripheral circuit simulation unit executes the peripheral circuit simulation for the notified simulation time. Thereafter, a machine language instruction execution simulation unit executes the machine language instruction execution simulation for the same time as the time in which the peripheral circuit simulation unit has executed the peripheral circuit simulation. Thus, the overhead such as communication between the simulation units and a preprocessing can be omitted so that the simulation processing speed can be elevated.

16 Claims, 10 Drawing Sheets

Fig. 7

PROCESSED QUEUE
— NOTHING

QUEUE BEING PROCESSED

| LINE NO. | 1 |
|---|---|
| CLOCK | 1 + 1 + 5 + 10 |

| LINE NO. | 2 |
|---|---|
| CLOCK | 1 + 5 + 10 |

| LINE NO. | 3 |
|---|---|
| CLOCK | 5 + 10 |

| LINE NO. | 4 |
|---|---|
| CLOCK | 10 |

Fig. 8

PROCESSED QUEUE

| LINE NO. | 1 |
|---|---|
| CLOCK | 1 + 1 + 5 + 10 |

| LINE NO. | 2 |
|---|---|
| CLOCK | 1 + 5 + 10 |

| LINE NO. | 3 |
|---|---|
| CLOCK | 5 + 10 |

| LINE NO. | 4 |
|---|---|
| CLOCK | 10 |

| LINE NO. | 5 |
|---|---|
| CLOCK | 10 |

QUEUE BEING PROCESSED

Fig. 9

PROCESSED QUEUE

| LINE NO. | 1 |
|---|---|
| CLOCK | 1 + 1 + 5 + 10 |

| LINE NO. | 2 |
|---|---|
| CLOCK | 1 + 5 + 10 |

| LINE NO. | 3 |
|---|---|
| CLOCK | 5 + 10 |

| LINE NO. | 4 |
|---|---|
| CLOCK | 10 |

| LINE NO. | 5 |
|---|---|
| CLOCK | 10 |

QUEUE BEING PROCESSED

| LINE NO. | 6 |
|---|---|
| CLOCK | 1 + 5 |

| LINE NO. | 7 |
|---|---|
| CLOCK | 5 |

SIMULATION SYSTEM AND METHOD FOR MICROCOMPUTER PROGRAM

BACKGROUND OF THE INVENTION

1. Field of the Invention

The present invention relates to a simulation system and method for a microcomputer program.

2. Description of Related Art

In order to operate a hardware in a microcomputer, a program is indispensable which instructs an operation of the microcomputer. In developing a program, it is necessary to ascertain or verify the operation based on the program by actually executing the program on the hardware on which the program is to be caused to run, in order to ascertain that the program properly operates, and in order to investigate a cause when the program does not properly operate. However, when the program cannot be executed on an actual hardware, as in one case where the program is developed concurrently with and in parallel with the development of hardware, and therefore, the operation based on the program cannot be ascertained until the hardware is completed, and as in another case where the hardware is expensive and the operation ascertainment or verification incurs a large cost. To resolve this problem, there is adopted a simulation method of performing the operation ascertainment or verification by executing the program under development, on a hardware different from the hardware on which the program under development is to be caused to run.

For example, Japanese Patent Application Pre-examination Publication No. JP-A-06-208480, (an English abstract of JP-A-06-208480 is available from the Japanese Patent Office, and the content of the English abstract of JP-A-06-208480 is incorporated by reference in its entirety into this application) discloses one prior art simulation method in which an operation verification is executed by operating a plurality of simulation means controlled by a control means.

Referring to FIG. 1, there is shown a block diagram of a system for performing the prior art simulation method disclosed by the above referred patent publication.

The shown simulation system includes a keyboard 100, a computer 101, a simulation information hold memory 106 and a display 108, which are coupled as shown. The computer 101 internally includes an input analysis means 102, a simulation control means 103, a machine language instruction execution simulation means 104, a peripheral circuit simulation means 105 and a simulation information indication means 107, which are coupled as shown.

An input content of the keyboard 100, which represents the directions given from a program developer, are supplied to the input analysis means 102 of the microcomputer 101. The input analysis means 102 analyzes the directions supplied through the keyboard 100. When the directions indicate execution of the simulation, the input analysis means 102 supplies the received directions to the simulation control means 103, and when the directions indicates an information indication, the input analysis means 102 supplies the received directions to the simulation information indication means 107.

The simulation control means 103 controls execution and stop of simulation in each of the machine language instruction execution simulation means 104 and the peripheral circuit simulation means 105. The machine language instruction execution simulation means 104 executes a program prepared by the program developer, sequentially at a machine language level. The peripheral circuit simulation means 105 simulates a peripheral circuit of the microcomputer. Here, the peripheral circuit of the microcomputer realizes, for example, a timer function and a communication function, which are effective for control of the hardware.

The simulation information hold memory 106 stores information of the machine language instruction execution simulation means 104 and the peripheral circuit simulation means 105 when the simulation is executed. The simulation information hold memory 106 includes therein a special function register (not shown), and the peripheral circuit simulation means 105 is controlled by the content of the special function register written by the machine language instruction execution simulation means 104.

The simulation information indication means 107 fetches information from the simulation information hold memory 106 in accordance with the directions supplied from the input analysis means 102 and the simulation control means 103, and controls the display 108 to cause the display 108 to display the fetched information. Namely, the display 108 displays the information supplied from the simulation information indication means 107.

Here, in the case of ascertaining the operation based on a program for controlling a system including a peripheral device, it is meaningless to simulate only the program. It is important in the operation ascertainment, to simulate the input/output of the peripheral device. Because of this, the peripheral circuit simulation means 105 for simulating the operation of the peripheral device, is caused to operate concurrently with the machine language instruction execution simulation means 104, so that the simulation including an interaction between these means is realized. In this case, the input/output of data and various commands of respective means is simulated by using the simulation information hold memory 106 as a common memory, with the result that simulation of each means cannot be executed independently of the other means.

In the prior art simulation method, therefore, the peripheral circuit simulation and the machine language instruction execution simulation are alternately executed within each one simulation unit time under the control of the simulation control means 103, in order to ensure such a condition that, when the processing of the simulation of one means has an influence on the operation of the simulation of the other means, after the processing of the simulation of the one means has been completed, the simulation of the other means is executed. Here, the simulation time unit is defined by a minimum unitary time in which the simulation is executed, and corresponds to an operation clock or an instruction execution clock in a microcomputer which is a simulation target.

Referring to FIG. 2, there is shown a flow chart illustrating the operation of various parts in the microcomputer 101 in the prior art simulation system. Now, the procedure of the prior art simulation method will be described with reference to FIG. 2.

If the directions for execution of the simulation are supplied from the input analysis means 102 to the simulation control means 103, the simulation control means 103 outputs the directions for execution of the peripheral circuit simulation in one simulation unit time, to the peripheral circuit simulation means 105 (step 1200). If the peripheral circuit simulation is completed, the simulation control means 103 ascertains whether or not an interrupt has been generated as the result (step 1201). If the interrupt has been generated, the processing for stating the interrupt is executed (step 1202), and thereafter, the directions for start of the machine language instruction execution simulation in one simulation unit time are outputted to the machine language instruction execution simulation means 104 (step 1203). If it is ascertained in the step 1201 that the interrupt has not been generated, the directions for start of the machine language instruction execution simulation in one simulation unit time are outputted to the machine language instruction execution simulation means 104 without executing the processing for starting the interrupt. If the machine language instruction execution simulation is completed, since the respective simulations within one simulation unit time have been completed, the simulation control means 102 ascertains whether the simulation should be ended or continued (step 1204). If the simulation should be ended, the processing is completed. On the other hand, if the simulation should be continued, the operation is returned to the first processing (namely, the step 1200).

A cause for deciding in the step 1204 that the simulation should be ended, includes an interruption attributable to a break point, and an interruption ordered by a user. The break point is a location where a break command is inserted for stopping the program in a software manner.

In the above mentioned prior art simulation method, since the respective simulations are alternately executed within each one simulation unit time, even if there occurs an operation such as an interrupt which gives influence on the operation of the other simulation means, the processing for the interrupt can be immediately executed, with the result that the respective simulations can be exactly executed.

On the other hand, since the peripheral circuit simulation and the machine language instruction execution simulation are alternately executed within each one simulation unit time, there is a problem that the simulation speed is low because of an overhead such as communication between the respective simulation means and a preprocessing.

SUMMARY OF THE INVENTION

Accordingly, it is an object of the present invention to provide a simulation system and method for a microcomputer program, which have overcome the above mentioned defect of the conventional one.

Another object of the present invention is to provide a simulation system and method for a microcomputer program, capable of exactly simulating time series events, as in simulation of the microcomputer, with an elevated simulation speed.

The above and other objects of the present invention are achieved in accordance with the present invention by a computer program simulation which is performed by continuously executing each of the machine language instruction execution simulation and the peripheral circuit simulation within a time range in which the result of each simulation gives no influence on the other simulation.

According to another aspect of the present invention, there is provided a computer program simulation system so configured that, after a machine language instruction execution simulation is ended, a simulation control means for deriving a time until the result of execution of a next machine language instruction execution simulation has an influence on an operation of a peripheral circuit simulation. The simulation control means notifies the derived time to the peripheral circuit simulation means to cause the peripheral circuit simulation means to continuously execute the peripheral circuit simulation for the derived time. On the other hand, the peripheral circuit simulation means ends the peripheral circuit simulation within a range in which the result of execution of the peripheral circuit simulation has no influence on the machine language instruction execution simulation, and the simulation control means notifies the machine language instruction execution simulation means a time in which the peripheral circuit simulation has been continuously executed. Thus, each of the machine language instruction execution simulation means and the peripheral circuit simulation means continuously executes a respective simulation for the time notified from the simulation control means.

In an embodiment, after the machine language instruction execution simulation is ended, the simulation control means calculates a time until a branch instruction appears, a time until a software interrupt instruction appears, and a time until a special function register writing instruction appears, and selects the shortest time from the group including the three calculated times and a default simulation maximum time allowing a continuous execution of the simulation. The simulation control means determines the shortest time as the time until the result of execution of the next machine language instruction execution simulation gives an influence on the operation of the peripheral circuit simulation.

In a typical embodiment, a maximum time in which the machine language instruction execution simulation means gives no influence onto the operation of the peripheral circuit simulation means, is calculated, and the calculated time is notified to the peripheral circuit simulation means so as to cause the peripheral circuit simulation means to execute the peripheral circuit simulation. In the peripheral circuit simulation means, the peripheral circuit simulation is continuously executed for the notified time unless there occurs an operation giving an influence onto the operation of the machine language instruction execution simulation. If the peripheral circuit simulation is completed, the machine language instruction execution simulation means continuously executes the machine language instruction execution simulation for the same time as the time in which the peripheral circuit simulation was continuously executed in the peripheral circuit simulation means.

In the above mentioned simulation method in accordance with the present invention, since each of the machine language instruction execution simulation and the peripheral circuit simulation can be continuously executed, it is possible to omit the overhead such as the communication between simulation means and the preprocessing, and therefore, the simulation processing speed can be elevated.

According to still another aspect of the present invention, before execution of each simulation, and from the computer program to be simulated, there is derived a time in which the result of execution of a machine language instruction execution simulation gives no influence on an operation of a peripheral circuit simulation. The machine language instruction execution simulation and the peripheral circuit simulation are continuously executed, respectively, in a time range in which the result of each of the machine language instruction execution simulation and the peripheral circuit simulation gives no influence on the other of the machine language instruction execution simulation and the peripheral circuit simulation.

In an embodiment, a simulation control means derives the time until the result of execution of the machine language instruction execution simulation gives an influence on the operation of the peripheral circuit simulation, from the computer program to be simulated, and before execution of each simulation.

In this embodiment, since the time in which the result of execution of a machine language instruction execution simulation gives no influence on an operation of a peripheral circuit simulation, is previously calculated, before execution of each simulation, from the computer program to be simulated, it is possible to omit the calculation of the simulation time in the course of execution of the simulation, and therefore, to further elevate the simulation processing speed.

In another embodiment, a peripheral circuit simulation means stops the peripheral circuit simulation when in the course of operation of the peripheral circuit simulation there is generated an interrupt giving an influence on an operation of the machine language instruction execution simulation means, and notifies the time in which the peripheral circuit simulation has been continuously executed, to the simulation control means. The simulation control means notifies the time notified from the peripheral circuit simulation means, as a simulation execution time to the machine language instruction execution simulation means, thereby to cause the machine language instruction execution simulation means to continuously execute the machine language instruction execution simulation for the simulation execution time.

The above and other objects, features and advantages of the present invention will be apparent from the following description of preferred embodiments of the invention with reference to the accompanying drawings.

BRIEF DESCRIPTION OF THE DRAWINGS

FIGS. 7, 8 and 9 show three different intermediate conditions of the debug information processed in accordance with the flow chart shown in FIG. 6.

DESCRIPTION OF THE PREFERRED EMBODIMENTS

Figure 3:
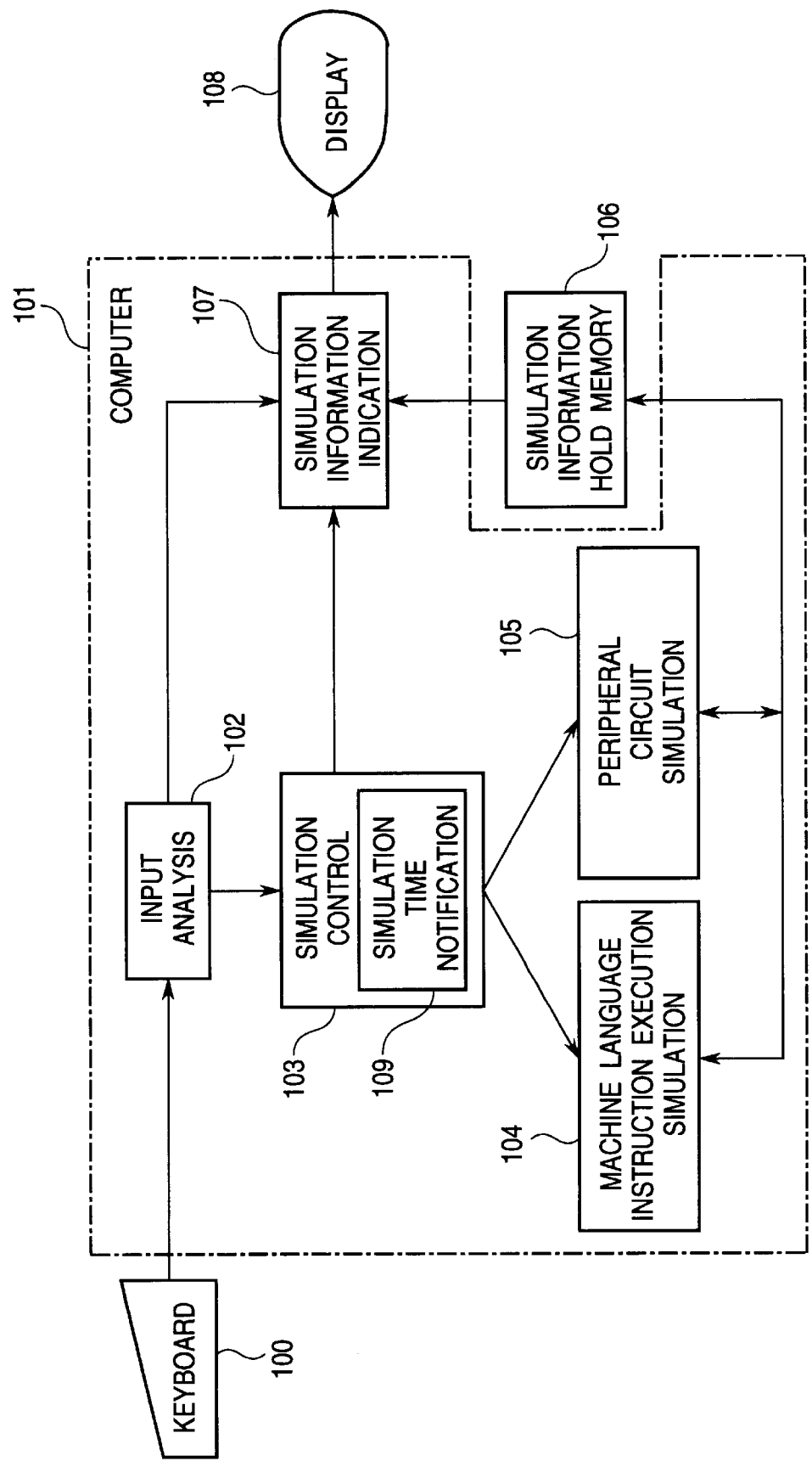
FIG. 3 is a block diagram of an embodiment of the simulation system in accordance with the present invention, for executing a first embodiment of the simulation method in accordance with the present invention.

Referring to FIG. 3, there is shown a block diagram of an embodiment of the simulation system in accordance with the present invention, for executing a first embodiment of the simulation method in accordance with the present invention. In FIG. 3, elements corresponding to those shown in FIG. 1 are given the same Reference Numerals, and explanation thereof will be omitted for simplification of description.

Figure 1:
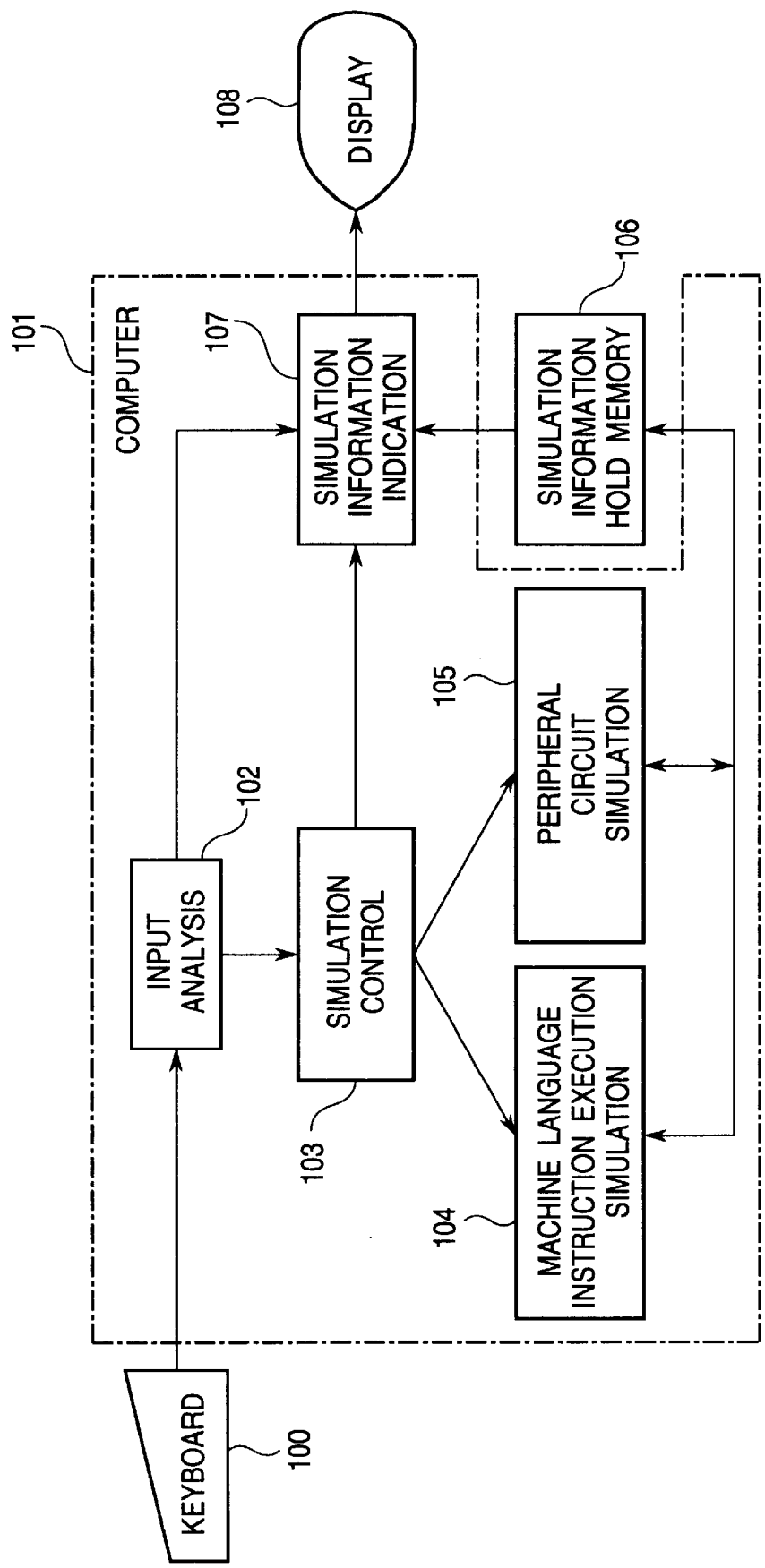
FIG. 1 is a block diagram of a system for performing the prior art simulation method.
Figure 2:
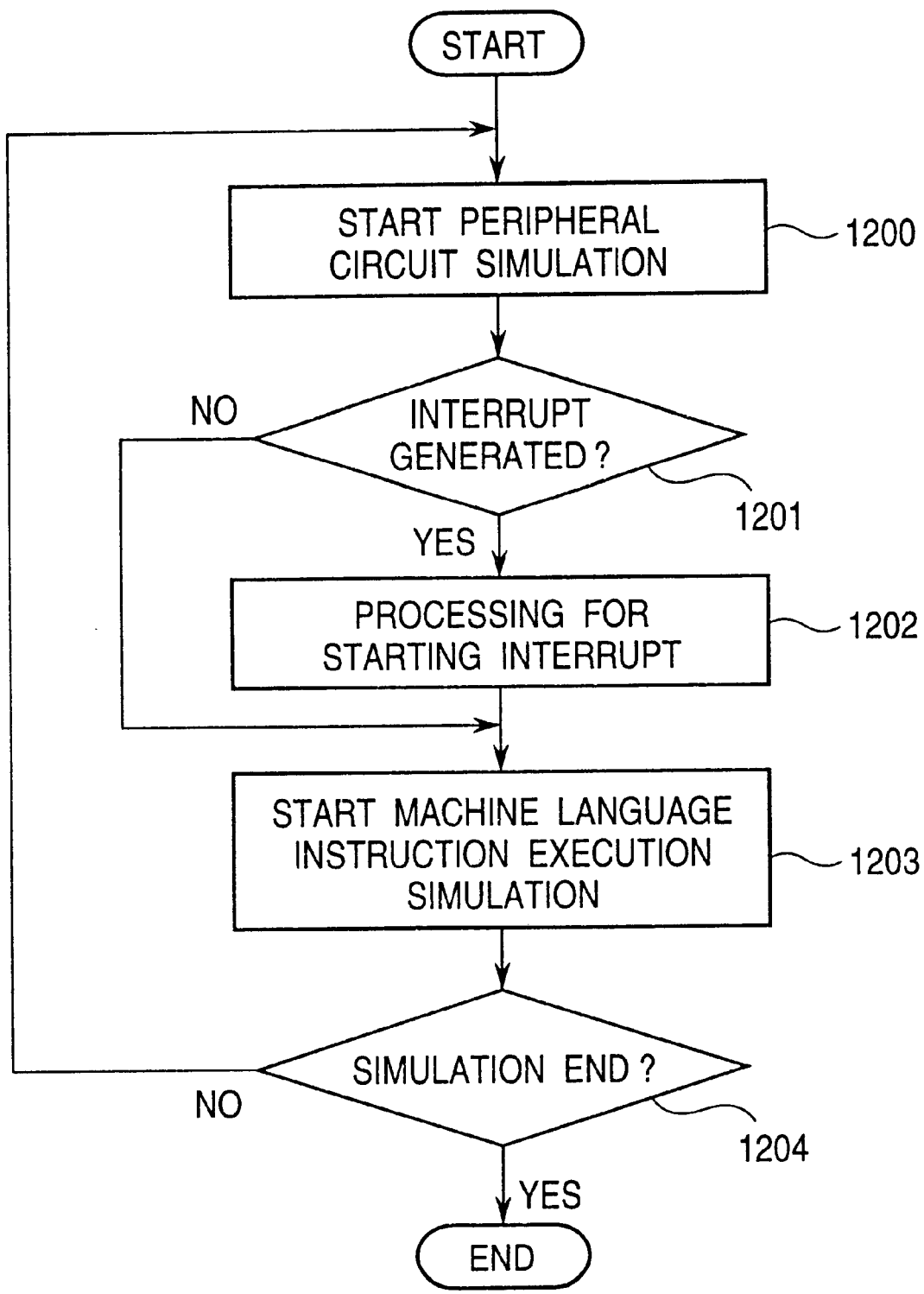
FIG. 2 is a flow chart illustrating the operation of various parts in the microcomputer in the prior art simulation system.

As seen from comparison between FIGS. 1 and 3, the embodiment shown in FIG. 3 is different from the prior art system shown in FIG. 1 only in that the simulation control means 103 includes a simulation time notification means 109 for notifying a simulation time to the machine language instruction execution simulation means 104 and the peripheral circuit simulation means 105.

In brief, the shown embodiment is so configured that a maximum time during which the machine language instruction execution simulation means 104 has no influence onto the operation of the peripheral circuit simulation means 105, is calculated, and the calculated time is notified to the peripheral circuit simulation means 105 so as to cause the peripheral circuit simulation means 105 to execute the peripheral circuit simulation, and in the peripheral circuit simulation means 105, the peripheral circuit simulation is continuously executed for the notified time unless there occurs an operation that influences the operation of the machine language instruction execution simulation, and then, if the peripheral circuit simulation is completed, the machine language instruction execution simulation means 104 continuously executes the machine language instruction execution simulation for the same time as the time during which the peripheral circuit simulation was continuously executed in the peripheral circuit simulation means 105.

Figure 4:
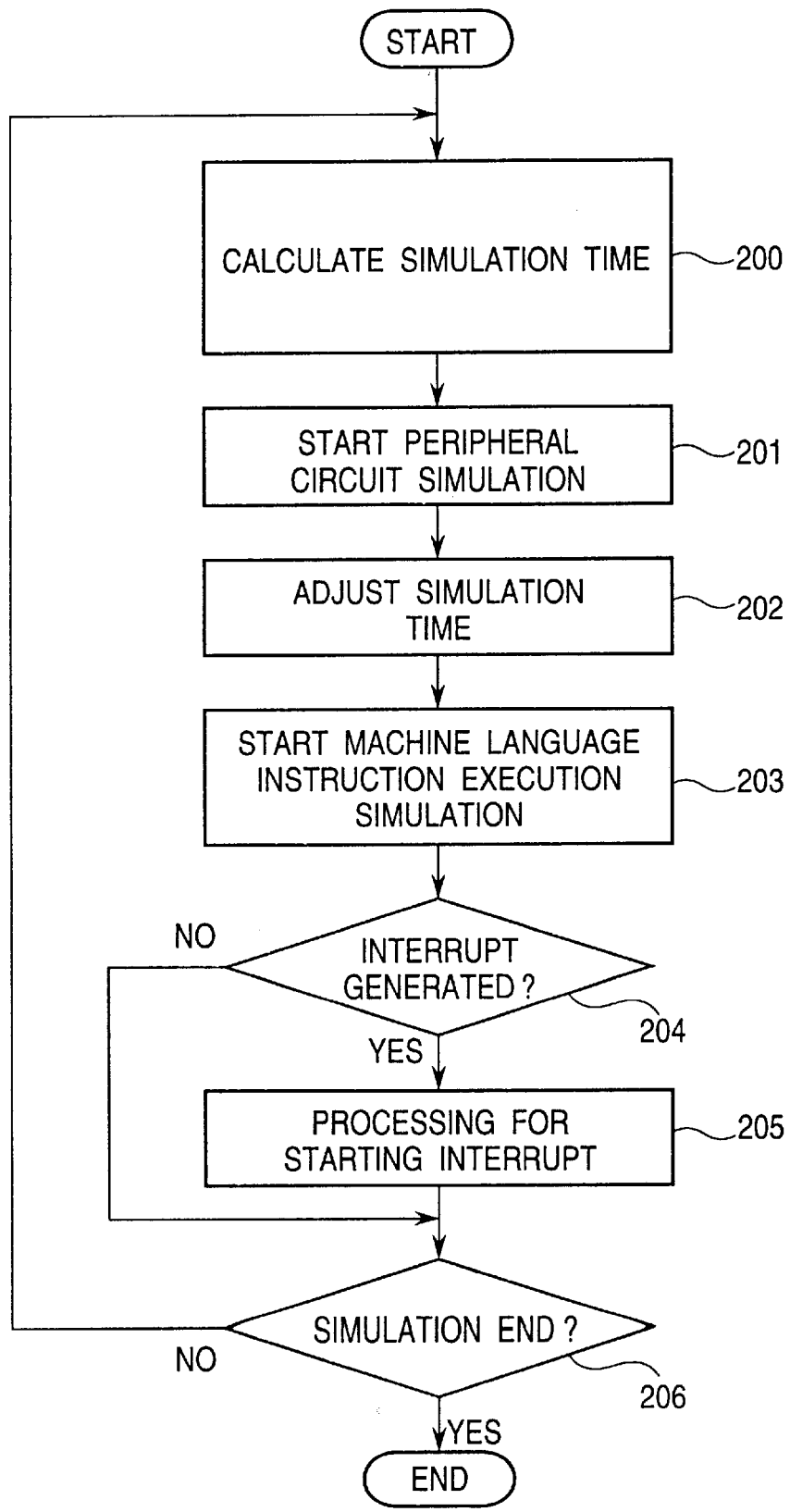
FIG. 4 is a flow chart illustrating the first embodiment of the simulation method in accordance with the present invention.

Now, the processing procedure of the first embodiment of the simulation method in accordance with the present invention will be described with reference to FIG. 4, which is a flow chart illustrating the first embodiment of tile simulation method in accordance with the present invention.

First, the simulation control means 103 investigates a program to be simulated, and calculates a time period until a next branch instruction appears, a time period until a next software interrupt instruction appears, and a time period until a next special function register writing instruction appears, and selects, as a simulation time, the shortest time from the group including the three calculated times and a previously set default simulation maximum time (step 200). Here, the software interrupt instruction is an instruction for generating an interrupt by the machine language instruction execution, and therefore, is different from an interrupt requested from a peripheral circuit. The default simulation maximum time is a constant limit time set for preventing the simulation time from becoming too long when there is no interrupting cause in the way of the simulation process in the case that the simulation is continuously executed.

The reason for calculating the time period until a next branch instruction appears and the time period until a next software interrupt instruction appears, is that, after each of these instructions is executed, since the instruction branch is performed, there is possibility that the peripheral function is subjected to influence at the branch destination, and therefore, the processing is stopped at this stage at once. The special function register stores the data used for operating the peripheral function, and if information is newly written into the special function register, the operation of the peripheral function is modified. The reason for setting the default simulation maximum time, is to prevent a display updating interval from becoming too long, when the simulation is continuously executed and the display is dynamically modified in the process of the simulation execution.

After the simulation time is calculated, the simulation control means 103 transfers the obtained simulation time to the peripheral circuit simulation means 105, and instructs execution of the peripheral circuit simulation to the peripheral circuit simulation means 105 (step 201).

In the peripheral circuit simulation means 105, the peripheral circuit simulation processing is executed within the simulation time notified from the simulation control means 103. However, when there occurs an interrupt or the like which is considered to have an influence on the machine language instruction execution simulation, the peripheral circuit simulation is stopped, and the time of the simulation which has been executed until the peripheral circuit simulation is stopped, is notified to the simulation control means 103, and the processing is returned to the simulation control means 103. In addition, when the peripheral circuit simulation processing has been executed without interruption within the simulation time notified from the simulation control means 103, the peripheral circuit simulation means 105 informs the simulation control means 103 of the time of the simulation which has been executed until the end of the peripheral circuit simulation processing, and then, returns the processing to the simulation control means 103.

The simulation control means 103 sets the time informed from the peripheral circuit simulation means 105, as a new simulation time (step 202). Furthermore, the simulation control means 103 notifies the newly set simulation time to the machine language instruction execution simulation means 104, and instructs execution of the machine language instruction execution simulation only for the newly set simulation time (step 203).

When the peripheral circuit simulation means 105 has executed the peripheral circuit simulation without interruption within the simulation time notified from the simulation control means 103, the time notified from the simulation control means 103 to the machine language instruction execution simulation means 104 is the same as the time notified from the simulation control means 103 to the peripheral circuit simulation means 105. This means that the machine language instruction execution simulation means 104 continuously executes the machine language instruction execution simulation until a point just before the point in the program, where there occurs an operation having possibility of giving any influence onto the peripheral circuit simulation.

When the peripheral circuit simulation means 105 has stopped the peripheral circuit simulation at a time shorter than the simulation time notified from the simulation control means 103, the machine language instruction execution simulation means 104 executes the machine language instruction execution simulation only for the time notified from the peripheral circuit simulation means 105 through the simulation control means 103, and then, stops the machine language instruction execution. Therefore, the machine language instruction execution simulation is stopped at the point where the peripheral circuit simulation has been stopped. At this point, whether or not the interrupt has been generated in the peripheral circuit simulation, is ascertained (step 204). If the interrupt has been generated, processing for executing the interrupt is performed (step 205). With this processing, the interrupt generated in the peripheral circuit simulation is processed.

In the above mentioned operation, the machine language instruction execution simulation is executed for only the same time as the time in which the peripheral circuit simulation has been executed.

Thereafter, whether the simulation of the computer program should be ended or continued, is ascertained (step 206). If the simulation of the computer program should be ended, the operation of the simulation is completed. If the simulation of the computer program should be continued, the processing is returned to the first processing, so that the above mentioned simulation operation is repeated.

In the repeated simulation operation, the peripheral circuit simulation means 105 and the machine language instruction execution simulation means 104 alternately execute the respective simulations in such a manner that each of the peripheral circuit simulation means 105 and the machine language instruction execution simulation means 104 continuously executes the simulation until there occurs an operation influencing the operation of the other simulation means.

Figure 5:
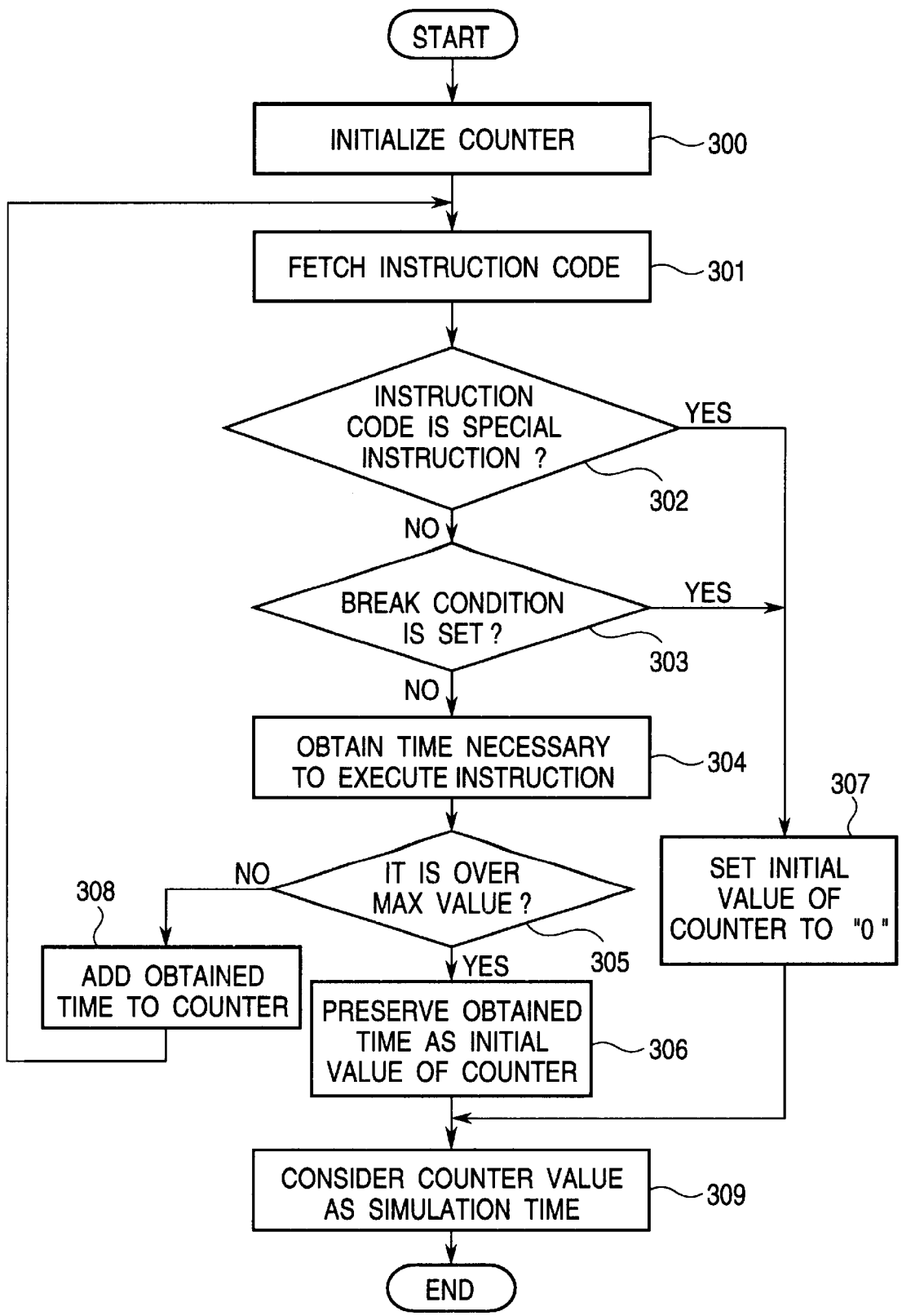
FIG. 5 is a flow chart illustrating, in detail, the calculation processing of the simulation time in the simulation method shown in FIG. 4.

Now, the step 200 shown in FIG. 4 for obtaining the simulation time, will be described with FIG. 5. First, a counter (not shown but a function ordinarily provided in the microcomputer) for calculating the simulation time is initialized (step 300). If the initialization is for a first simulation time calculation, an initial value of the counter is set to "0", and if the initialization is for second and succeeding simulation time calculations, an initial value preserved in a step 306 or 307 described hereinafter in a just preceding simulation time calculation, is put as the initial value of the counter.

Thereafter, an instruction code is fetched from a simulation target program storing region (step 301), and whether or not the fetched instruction is any one of a branch, a software interrupt and a special function register writing, is ascertained (step 302). If the fetched instruction is any one of the branch, the software interrupt and the special function register writing, "0" is preserved as the value which will be set as an initial value into the counter in a next simulation time calculation (step 307), and the value of the counter is treated as the simulation time (step 309), and then, the simulation time calculation processing is completed. On the other hand, if the fetched instruction is none of the branch, the software interrupt and the special function register writing, whether or not a break condition (given by inserting a break command) is set, is ascertained (step 303). If the break condition is set, the processing goes into the step 307. If the break condition is not set, a time required for executing the fetched instruction is obtained (step 304).

The time required for executing the fetched instruction is obtained from a table in which various instructions included in the simulator and corresponding execution times are tabulated in a one-to-one relation.

Then, whether or not "the obtained time plus the counter value" is larger than the maximum value, is ascertained (step 305). If "the obtained time plus the counter value" is larger than the maximum value, the time obtained in the step 304 is neither counted nor added in the current simulation time calculation, but preserved as an initial value of the counter for a next simulation time calculation (step 306). Thereafter, the processing goes into the step 309. On the other hand, if "the obtained time plus the counter value" is not larger than the maximum value, the time obtained in the step 304 is added to the value of the counter (step 308), and the processing returns to the step 301, so that the steps 301 to 308 are repeated.

With above mentioned processing, it is possible to obtain a time in which the machine language instruction execution simulation gives no influence onto the peripheral circuit simulation.

Now, a second embodiment of the simulation method in accordance with the present invention will be described. In the first embodiment, the calculation of the simulation time is carried out in the course of execution of the simulation, and therefore, the processing speed of the simulation becomes lowered by the time required for calculation of the simulation time.

The second embodiment resolves this inconvenience. The fact that the machine language instruction execution has an influence onto the operation of the peripheral circuit simulation, is attributable to the fact that there is a writing to the special function register. This timing can be known from a program prepared by a user. In addition, a timing where a flow of the program changes, and an instruction generating an interrupt, can be also known from the program prepared by the user. On the other hand, the influence from the peripheral circuit simulation to the machine language instruction execution simulation cannot be known unless the peripheral circuit simulation is executed. In other words, the influence from the peripheral circuit simulation to the machine language instruction execution simulation cannot be known from the program prepared by the user.

In the second embodiment, therefore, before the execution of the simulation, the simulation time in which the machine language instruction execution has no influence onto the operation of the peripheral circuit simulation, is previously calculated from the program to be simulated, and the time required for calculation of the simulation time is omitted from the course of execution of the simulation, thereby to further elevate the processing speed of the simulation.

Since the machine language is difficult for a human to understand, a program developer prepares a program in the form easy for a human being to understand (which is called a "source program"), and then, translates the source program into a machine language program by use of a software called a translator, which translates a programming language other than the machine language, into the machine language.

In addition, when the source program is translated, it is possible to prepare debug information (information required for debugging) together with the machine language program, and to utilize the debug information at the time of debugging. For example, a simple example of the debug information is line information indicating what line of the source program corresponds to the machine language program. By extending the debug information to include the information of the simulation time, it is possible to utilize the simulation time in the course of the simulation.

Figure 6:
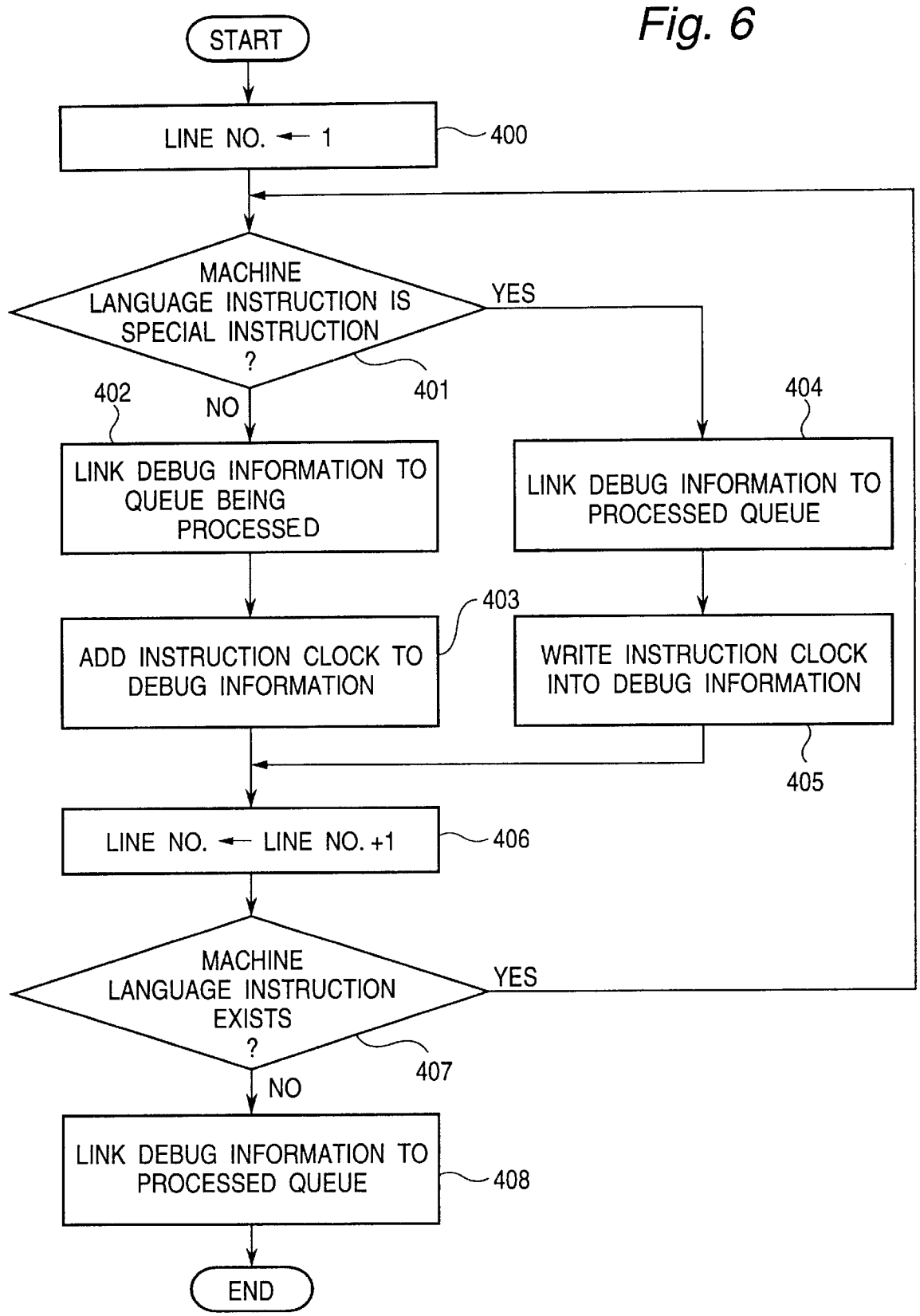
FIG. 6 is a flow chart illustrating the procedure for causing the debug information to have the simulation time information.

Referring to FIG. 6, there is shown a flow chart illustrating a method for calculating the simulation time from the source program written in the machine language, before the simulation. First, the calculation method will be described with reference to FIG. 6, and thereafter, specific examples will be described with FIGS. 7 to 9 and tables 1 and 2.

First, in a processing shown by a step 400 shown in FIG. 6, initialization is carried out by putting "1" into "LINE NO." indicating the line number of the source program Then, whether or not the machine language instruction of the number indicated by "LINE NO." is any of the branch instruction, the software interrupt instruction and the special function register writing instruction, is ascertained (step 401). If it is none of these instructions, the debug information of the number indicated by "LINE NO." is added to debug information group being processed (step 402).

Here, a queue structure is considered as a format for handling the debug information as the debug information because, in the queue structure, each one information has means for indicating a preceding information and a succeeding information, and the information group constitutes a string or array, and therefore is suitable to increasing the number of information or changing the order of information.

After the processing in the step 402, the instruction clock number of the machine language instruction of the number indicated by "LINE NO." is added to all the debug information linked in a string form within the queue being under processing (step 403).

On the other hand, if in the processing of the step 401 it is ascertained that the machine language instruction of the number indicated by "LINE NO." is any of the branch instruction, the software interrupt instruction and the special function register writing instruction, the debug information linked in a string form within the queue being processed is moved to and linked in a string form within the processed queue (step 404), and thereafter, the instruction clock number of the machine language instruction of the number indicated by "LINE NO." is added to the debug information of the number indicated by "LINE NO.", and the modified debug information is added to the processed queue.

After either the steps 402 to 403 or the steps 404 to 405 are completed, "LINE NO." is incremented by "1" (step 406), and whether or not there exists the machine language instruction of the number indicated by "LINE NO." obtained in the step 406, is investigated (step 407). If it exists, the processing returns to the step 401, so that the steps 401 to 406 are repeated. On the other hand, if it does not exist, the debug information linked in a string form within the queue being processed is moved to and linked in a string form within the processed queue (step 408), and then, the processing is ended.

The following table 1 shows a simulation target program program to be simulated). A left side number indicates the line number ("LINE NO."), and a right side shows an instruction. In the following table 1, a fifth line and a ninth line are a branch instruction, and an eighth line is a special function register writing.

TABLE 1

| 1: | MOV r0, #00 |
|---|---|
| 2: | MOV r1, r0 |
| label 1; | |
| 3: | ADD r0, #01 |
| 4: | CMP r0, #10 |
| 5: | BZ label 2 |
| 6: | MOV r1, r0 |
| 7: | ADD r1, r0 |
| 8: | MOV S1, r0 |
| 9: | BR label 1 |
| label 2; | |

The following table 2 is a table in which various instructions and the clock numbers required for execution of respective instructions are tabulated in a one-to-one relation.

TABLE 2

| instructions | clock number |
|---|---|
| MOV r0, #00 | 1 |
| MOV r1, r0 | 1 |
| MOV S1, r0 | 1 |
| ADD r0, #01 | 5 |
| ADD r1, r0 | 5 |
| CMP r0, #10 | 10 |
| BZ label 2 | 10 |
| BR label 1 | 10 |

FIGS. 7 to 9 illustrate different intermediate conditions in processing the simulation target program shown in the table 1, in accordance with the flow chart shown in FIG. 6, and by using the table 2. FIG. 7 illustrates the condition in which the processing is advanced to the fourth line of the program of the table 1 and the processing has reached the step 407 shown in FIG. 6. FIG. 8 illustrates the condition in which the processing is advanced to the fifth line of the program of the table 1 and the processing has reached the step 407 shown in FIG. 6. FIG. 9 illustrates the condition in which the processing is advanced to the seventh line of the program of the table 1 and the processing has reached the step 407 shown in FIG. 6.

In the condition shown in FIG. 7, there is no processed debug information, and in a queue being processed, the debug information corresponding to the first to fourth lines shown in the table 1 are linked in a string form. In the debug information for the first line, the clock information "CLOCK" shows a total clock number of the instructions from the first line to the fourth line, and in the debug information for the second line, the clock information "CLOCK" shows a total clock number of the instructions from the second line to the fourth line. Similarly, the clock information "CLOCK" for the other lines shows a total clock number.

In the condition shown in FIG. 8, since the fifth line is the branch instruction, all the debug information linked in the string form with in the queue being processed, is moved into the processed queue and is linked in a string form within the processed queue. The clock information for the first to fourth lines does not change from that shown in FIG. 7, but the clock information is written into the fifth line.

In the condition shown in FIG. 9, the processed queue is the same as that shown in FIG. 8, but in the queue being processed, the debug information corresponding to the six to seventh lines shown in the table 1 are linked in a string form. In the debug information for the sixth line, the clock information "CLOCK" shows a total clock number of the instructions from the sixth line to the seventh line, and the debug information for the seventh line, the clock information "CLOCK" shows only the clock number of the instructions of the seventh line.

Figure 10:
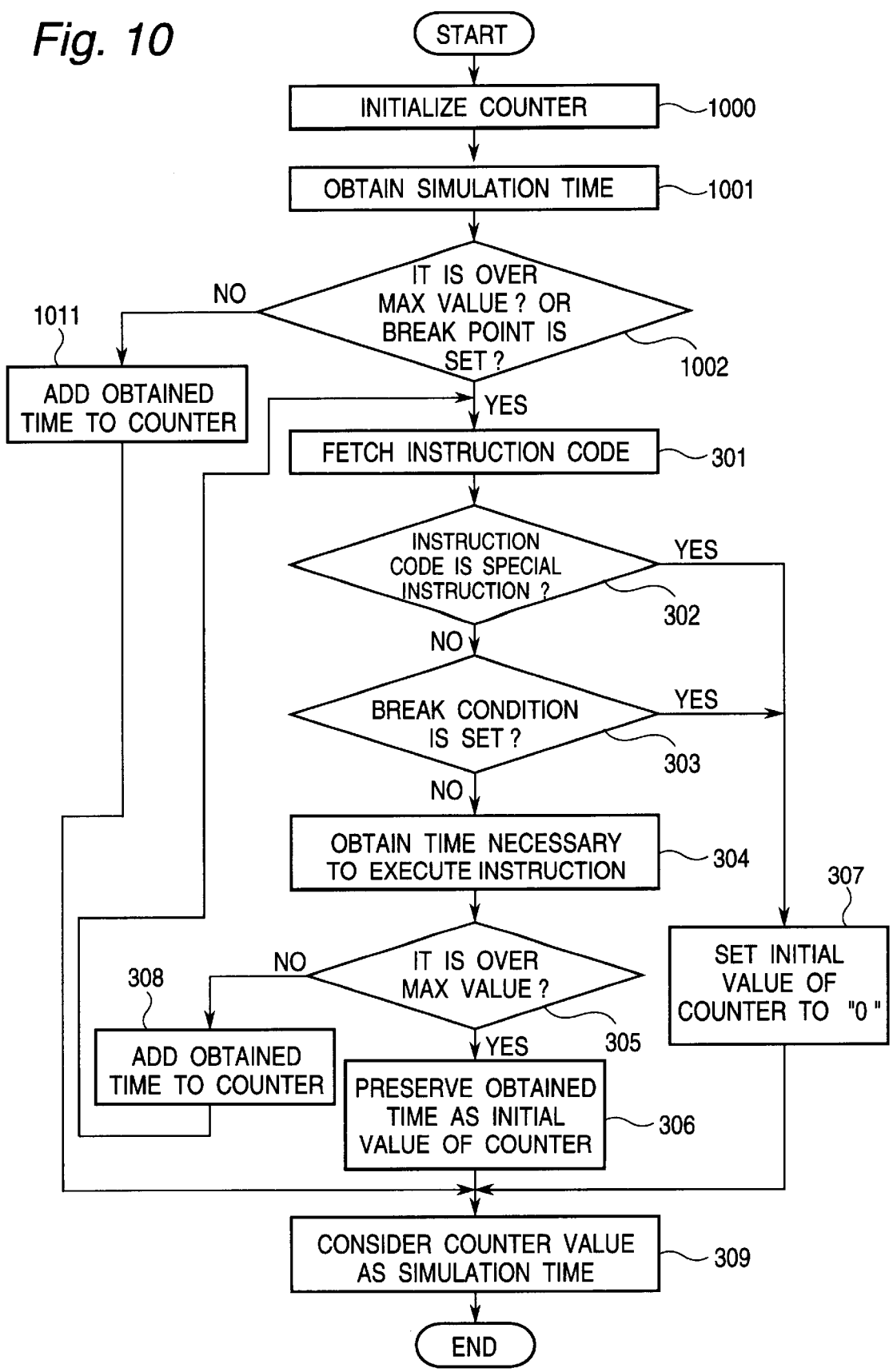
FIG. 10 is a flow chart illustrating, in detail, the calculation processing of the simulation time in a second embodiment of the simulation method in accordance with the present invention.

Referring to FIG. 10, there is shown a flow chart illustrating a simulation time calculating method when the above mentioned simulation time calculating method is applied as the step 200 shown in FIG. 4, namely, when a time period until a next special instruction (a next branch instruction, a next interrupt instruction or a next special function register writing instruction) is obtained from the debug information prepared in accordance with the method explained with reference to FIGS. 6 to 9 and the tables 1 and 2. In FIG. 10, steps corresponding to those shown in FIG. 5 are given the same Reference Numerals, and explanation thereof will be omitted.

First, the counter for calculating the simulation time is initialized (step 1000), and the time until the next special instruction (next branch instruction, next interrupt instruction or next special function register writing instruction) is obtained from the debug information (step 1001). Whether or not a break point exists in the obtained time, and whether or not the obtained time is larger than the default simulation maximum time, are ascertained (step 1002). If the break point exists or if the obtained time is larger than the maximum time, the processing in the steps 301 to 309 is executed. On the other hand, if the break point does not exist and if the obtained time is not larger than the maximum time, the obtained time is added to the counter (step 1011) and then, the processing of the step 309 is executed and the processing is ended.

As seen from the above, the simulation method and system in accordance with the present invention is characterized in that in the simulation of the computer program it is possible to omit the overhead such as the communication between simulation means and the preprocessing, the simulation processing speed can be elevated.

The invention has thus been shown and described with reference to the specific embodiments. However, it should be noted that the present invention is in no way limited to the details of the illustrated structures but changes and modifications may be made within the scope of the appended claims.

I claim:

1. A system for simulating a program for a computer, comprising:

a machine language instruction execution simulation means for sequentially executing machine language level instructions of the program;

a peripheral circuit simulation means for simulating a peripheral circuit of the computer; and a simulation control means for deriving a simulation period and notifying said peripheral circuit simulation means of the simulation period, wherein said peripheral circuit simulation means executes the peripheral circuit simulation for the simulation period so long as said peripheral circuit simulation does not influence the machine language instruction execution simulation, and wherein said simulation control means notifies said machine language instruction execution simulation means of the simulation period and said machine language instruction execution simulation means executes the machine language instruction execution simulation for the simulation period.

2. A system for simulating a program for a computer as claimed in claim 1 wherein said simulation control means calculates a time period until a branch instruction appears, a time period until a software interrupt appears, and a time period until a special function register writing instruction appears, and selects a shortest time from a group including the three calculated time periods and a default simulation maximum time as the simulation period.

3. A system for simulating a program for a computer as claimed in claim 1 wherein said simulation control means calculates a time period until a point in said next machine language instruction execution simulation which influences the operation of the peripheral circuit simulation as the simulation period.

4. A system for simulating a program for a computer as claimed in claim 1 wherein said peripheral circuit simulation means stops said peripheral circuit simulation if, during said peripheral circuit simulation, there is generated an interrupt having an influence on said machine language instruction execution simulation means and notifies said simulation control means of the shortened simulation period, and wherein said simulation control means notifies the said machine language instruction execution simulation means of the shortened simulation period, and said machine language instruction execution simulation means executes the machine language instruction execution simulation for said shortened simulation period.

5. A system for simulating a program for a computer as claimed in claim 1, wherein the simulation period is greater than one simulation time unit.

6. A system for simulating a program for a computer as claimed in claim 5, wherein the peripheral circuit simulation and the machine language instruction execution simulation are carried out sequentially and in that order one or more times until completion of the simulation.

7. A computer program simulation system, comprising:

a computer programmed to calculate a simulation period and to perform machine language instruction execution simulation and peripheral circuit simulation for the simulation period unless, if the simulation period is greater than a maximum simulation period, the machine language instruction execution simulation and the peripheral circuit simulation are performed for the maximum simulation period, and if one of the machine language instruction execution simulation and the peripheral circuit simulation contains a program step that influences the simulation of the other, the machine language instruction execution simulation and the peripheral circuit simulation are performed up until the program step.

8. A computer program simulation system as claimed in claim 7, wherein the program step of the machine language instruction execution simulation that influences the peripheral circuit simulation includes a branch instruction, a software interrupt, and a special function register writing instruction.

9. A computer program simulation system as claimed in claim 7, wherein the program step of the peripheral circuit simulation that influences the machine language instruction execution simulation includes an interrupt.

10. A computer program simulation system as claimed in claim 7, wherein the simulation period is greater than one simulation time unit.

11. A computer program simulation system as claimed in claim 10, wherein the computer is programmed to perform the peripheral circuit simulation and the machine language instruction execution simulation, sequentially and in that order, one or more times until completion of the computer program simulation.

12. A method of simulating a computer program, comprising the steps of:

calculating a simulation period for performing a machine language instruction execution simulation and a peripheral circuit simulation;

performing the peripheral circuit simulation for the simulation period or for a shortened simulation period if an interrupt having an influence on the machine language instruction execution simulation is generated by the peripheral circuit simulation; and performing the machine language instruction execution simulation for the same simulation period or shortened simulation period as the peripheral circuit simulation.

13. A method as claimed in claim 12, further comprising the step of determining if the interrupt has been generated and, if so, processing the interrupt after the machine language instruction execution simulation.

14. A method of simulating a computer program as claimed in claim 12, wherein the simulation period is greater than one simulation time unit.

15. A method as claimed in claim 14, wherein the steps of performing the peripheral circuit simulation and the machine language instruction execution simulation is carried out in that order one or more times until completion of the computer program simulation.

16. A method of simulating a computer program as claimed in claim 12, further comprising the steps of:

deriving a time period until a branch instruction appears, a time period until a software interrupt appears, and a time period until a special function register writing instruction appears; and setting a maximum simulation time period, wherein the step of calculating the simulation period includes the step of selecting a shortest one of the derived time periods and the maximum simulation time period.

\* \* \* \* \*